(12) United States Patent
Baldemair et al.

(10) Patent No.: US 12,160,390 B2
(45) Date of Patent: Dec. 3, 2024

(54) PUCCH STRUCTURE FOR MIXED NUMEROLOGY

(71) Applicant: Telefonaktiebolaget LM Ericsson (publ), Stockholm (SE)

(72) Inventors: Robert Baldemair, Solna (SE); Erik Dahlman, Stockholm (SE); Carola Faronius, Järfälla (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/154,188

(22) Filed: Jan. 13, 2023

(65) Prior Publication Data

US 2023/0155792 A1    May 18, 2023

Related U.S. Application Data

(63) Continuation of application No. 17/466,369, filed on Sep. 3, 2021, now Pat. No. 11,722,281, which is a
(Continued)

(51) Int. Cl.
*H04L 5/00* (2006.01)
*H04L 1/1812* (2023.01)
(Continued)

(52) U.S. Cl.
CPC .......... *H04L 5/0055* (2013.01); *H04L 1/1812* (2013.01); *H04L 5/0092* (2013.01);
(Continued)

(58) Field of Classification Search
CPC ... H04L 5/0055; H04L 5/0007; H04L 5/0053; H04L 5/0092; H04L 1/1812;
(Continued)

(56) References Cited

U.S. PATENT DOCUMENTS

| | | |
|---|---|---|
| 2014/0204961 A1 | 7/2014 | Hooli et al. |
| 2018/0220415 A1 | 8/2018 | Yin et al. |

FOREIGN PATENT DOCUMENTS

| | | |
|---|---|---|
| CN | 103874048 A | 6/2014 |
| EP | 2453605 A2 | 5/2012 |

(Continued)

OTHER PUBLICATIONS

International Search Report and Written Opinion dated Nov. 14, 2017 for International Application No. PCT/SE2017/050287 Filed on Mar. 24, 2017; consisting of 12 pages.
(Continued)

*Primary Examiner* — Ricardo H Castaneyra
(74) *Attorney, Agent, or Firm* — Weisberg I.P. Law. P.A.

(57) ABSTRACT

There is disclosed a user equipment for a Radio Access Network. The user equipment is adapted for communicating utilizing a first transmission timing structure having a first number of symbols, and for communicating utilizing a second transmission timing structure comprising a second number of symbols. The user equipment further is adapted for receiving first signaling based on the first transmission timing structure and for transmitting acknowledgement signaling pertaining to the first signaling based on the second transmission timing structure, wherein the user equipment is adapted to start transmitting the acknowledgement signaling at a starting symbol of the second transmission timing structure, the starting symbol being determined based on a configuration of the user equipment.

19 Claims, 15 Drawing Sheets

Related U.S. Application Data continuation of application No. 16/667,232, filed on Oct. 29, 2019, now Pat. No. 11,190,325, which is a continuation of application No. 16/401,409, filed on May 2, 2019, now Pat. No. 10,498,516, which is a continuation of application No. PCT/SE2017/050287, filed on Mar. 24, 2017.

(51) Int. Cl.
| | |
|---|---|
| *H04L 27/26* | (2006.01) |
| *H04W 72/0446* | (2023.01) |
| *H04W 72/20* | (2023.01) |
| *H04W 84/04* | (2009.01) |
| *H04W 88/02* | (2009.01) |

(52) U.S. Cl.
CPC ...... *H04L 27/26025* (2021.01); *H04L 5/0007* (2013.01); *H04L 5/0053* (2013.01); *H04W 72/0446* (2013.01); *H04W 72/20* (2023.01); *H04W 84/042* (2013.01); *H04W 88/02* (2013.01)

(58) Field of Classification Search
CPC ......... H04L 27/26025; H04L 27/2602; H04W 72/0446; H04W 72/1278; H04W 84/042; H04W 88/02; H04W 72/20
See application file for complete search history.

(56) References Cited

FOREIGN PATENT DOCUMENTS

| | | |
|---|---|---|
| RU | 2490803 C2 | 8/2013 |
| WO | 2005089216 A2 | 9/2005 |
| WO | 2009097602 A1 | 8/2009 |
| WO | 2009154640 A2 | 12/2009 |
| WO | 2013023683 A1 | 2/2013 |
| WO | 2016015531 A1 | 2/2016 |
| WO | 2016155531 A1 | 10/2016 |
| WO | 2016209139 A1 | 12/2016 |
| WO | 20162019139 A1 | 12/2016 |
| WO | 2017172447 A1 | 10/2017 |
| WO | 2017217903 A1 | 12/2017 |
| WO | 2018080212 A2 | 5/2018 |
| WO | 2018142202 A1 | 8/2018 |

OTHER PUBLICATIONS

3GPP TSG RAN WG1 #88 R1-1702989; Title: HARQ-ACK Feedback for Numerology Multiplexing; Agenda Item: 8.1.3.3.3; Source: Samsung; Document for: Discussion and Decision; Location and Date: Athens, Greece, Feb. 13-17, 2017; consisting of 5 pages.

3GPP TSG-RAN WG2 NR Ad Hoc R2-1700467; Title: MAC and HARQ Modelling with Multiple Numerologies; Agenda Item: 3.2.1.2; Source: InterDigital Communications; Document for: Discussion, Decision; Location and Date: Spokane, USA, Jan. 17-19, 2017; consisting of 3 pages.

TSG-RAN WG1 #86bis R1-1609618; Title: On slots and mini-slots; Agenda Item: 8.1.2.2; Source: Ericsson; Document for: Discussion and Decision; Location and Date: Lisbon, Portugal, Oct. 10-14, 2016; consisting of 3 pages.

3GPP TSG RAN WG1 NR-Adhoc Meeting R1-1700023; Title: Discussion on mini-slot for URLLC; Agenda Item: 5.1.3.4; Source: Huawei, HiSilicon; Document for: Discussion and decision; Location and Date: Spokane, Washington, Jan. 16-20, 2017; consisting of 8 pages.

3GPP TSG RAN WG1 AH_NR Meeting R1-1700617; Title: Summary of [87-36]: Mini-slot designs for NR; Agenda Item: 5.1.4; Source: NTT Docomo, Inc.; Document for: Discussion and Decision; Location and Date: Spokane, USA, Jan. 16-20, 2017; consisting of 23 pages.

European Search Report dated Jan. 20, 2021 for Application No. 17717518.9; consisting of 7 pages.

3GPP TSG RAN WG1 NR Ad Hoc Meeting R1-1700730; Title: 5G NR short PUCCH considerations; Source: Sharp; Agenda Item: 5.1.3.2; Document for: Discussion and Decision; Location and Date: Spokane, USA, Jan. 16-20, 2017; consisting of 4 pages.

Japanese Office Action with Summary English Translation dated Mar. 10, 2021 for Japanese Application No. 2019550597; consisting of 7 pages.

3GPP TSG RAN WG1 NR Ad Hoc Meeting R1-1702351; Title: Multiplexing eMBB and URLLC UL control channels; Source: ETRI; Agenda Item: 8.1.3.3.3 Others; Document for: Discussion; Date and Location: Feb. 13-17, 2017, Athens, Greece; consisting of 3 pages.

3GPP TSG RAN WG1 AH_NR Meeting R1-1700628; Title: Mini-slot for latency reduction; Source: NTT Docomo, Inc.; Agenda Item: 5.1.4; Document for: Discussion and Decision; Date and Location: Jan. 16-20, 2017, Spokane, USA; consisting of 7 pages.

Colombian Office Action with English Translation dated Jul. 8, 2021 for International Patent Application No. PCT/SE2017/050287 filed Mar. 24, 2017; consisting of 32 pages.

Chinese Office Action with English Summary Translation dated Jul. 14, 2021 for International Patent Application No. 201780088802.4; consisting of 8 pages.

3GPP TSG RAN W61 NR Ad-Hoc Meeting R1-1700467; Title: Discussion on UL-MIMO; Agenda Item:5.1.2.1; Source: LG Electronics; Document for: Discussion/Decision; Date and Location: Jan. 16-20, 2017, Spokane, USA; consisting of 5 pages.

Russian Decision to Grant and English machine translation dated Apr. 6, 2020 for Application No. 2019133764/07, consisting of 26 pages.

Colombian Office Action and English translation dated Feb. 28, 2022 for Application No. NC2019/0010966, consisting of 32 pages.

PUCCH STRUCTURE FOR MIXED NUMEROLOGY

CROSS-REFERENCE TO RELATED APPLICATIONS

This application is a continuation of U.S. application Ser. No. 17/466,369 filed Sep. 3, 2021, which is a continuation of U.S. application Ser. No. 16/667,232, filed Oct. 29, 2019, now issued U.S. Pat. No. 11,190,325, issued Nov. 30, 2021, which is a continuation of U.S. application Ser. No. 16/401,409, filed May 2, 2019, now issued U.S. Pat. No. 10,498,516, issued Dec. 3, 2019, which is a continuation of International Application No. PCT/SE2017/050287, filed Mar. 24, 2017, the entireties of all of which are incorporated herein by reference.

TECHNICAL FIELD

This disclosure pertains to wireless communication technology, in particular to 5G technology like LTE Evolution or New Radio (NR)

BACKGROUND

Currently developed wireless (radio) technology of the 5th generation (5G) is aimed at supporting a large range of use case, including such with requirements for low latency. On the other hand, 5G technology is being developed to be allow flexibility in transmission timing structures, and to utilize a wide frequency range. If carriers of significantly different frequencies are being utilized, transmission timings may be significantly different due to the different physical characteristics like bandwidth/spacing and symbol time length.

With these demands, new problems and challenges arise for example in the context of ARQ/HARQ processes.

SUMMARY

It is an object of this disclosure to provide approaches allowing suitable adaption to latency demand even in the presence of flexible transmission timing structures and/or in the context of large differences in frequency of carriers used. The approaches described herein are particularly useful in the context of NR Radio Access Technology/Networks (NR RAT/RAN). Thus, a network node may in particular a gNB (or eNB in some cases).

Accordingly, a user equipment, UE, for a Radio Access Network (RAN) is described. The user equipment is adapted for communicating utilizing a first transmission timing structure comprising a first number of symbols, and for communicating utilizing a second transmission timing structure comprising a second number of symbols. The user equipment is further adapted for receiving first signaling based on the first transmission timing structure, and for transmitting acknowledgement signaling pertaining to the first signaling based on the second transmission timing structure. Transmitting the acknowledgement signaling is started at a starting symbol of the second transmission timing structure, the starting symbol being determined based on a configuration of the user equipment. The user equipment may comprise, and/or be adapted for utilizing, processing circuitry and/or radio circuitry for receiving and/or transmitting. Radio circuitry may in particular comprise a receiver and/or transmitter and/or transceiver. Alternatively, or additionally, the UE may comprise a receiving module and/or transmitting module for the corresponding receiving and/or transmitting.

There is also disclosed a method of operating a user equipment for a Radio Access Network. The user equipment is adapted for communicating utilizing a first transmission timing structure comprising a first number of symbols, and for communicating utilizing a second transmission timing structure comprising a second number of symbols. The method comprises receiving first signaling based on the first transmission timing structure. The method further comprises transmitting acknowledgement signaling pertaining to the first signaling based on the second transmission timing structure. Transmitting the acknowledgement signaling is started at a starting symbol of the second transmission timing structure, the starting symbol being determined based on a configuration of the user equipment.

A network node for a Radio Access Network may be considered. The network node is adapted for communicating utilizing a first transmission timing structure comprising a first number of symbols, and for communicating utilizing a second transmission timing structure comprising a second number of symbols. In addition, the network node is adapted for configuring a user equipment for starting to transmit acknowledgement signaling pertaining to first signaling transmitted based on the first transmission timing structure at a starting symbol of the second transmission timing structure. The network node may comprise, and/or be adapted for utilizing, processing circuitry and/or radio circuitry for the configuring, respectively for receiving and/or transmitting. Radio circuitry may in particular comprise a receiver and/or transmitter and/or transceiver. Alternatively, or additionally, the network node may comprise a configuring module for such configuring, respectively a receiving module and/or transmitting module for the corresponding receiving and/or transmitting.

Also, a method of operating a network node of a Radio Access Network is described. The network node is adapted for communicating utilizing a first transmission timing structure comprising a first number of symbols, and for communicating utilizing a second transmission timing structure comprising a second number of symbols. The method comprises configuring a user equipment for starting to transmit acknowledgement signaling pertaining to first signaling transmitted based on the first transmission timing structure at a starting symbol of the second transmission timing structure.

It may be considered that the network node is adapted for, and/or the method of operating the network node comprises, transmitting the first signaling, and/or receiving the acknowledgement signaling.

The configuration may indicate the starting symbol, e.g. directly or indirectly, and/or implicitly or explicitly. For example, the starting symbol number may be indicated directly (for example, as a number), or in relation to a symbol or border of the first transmission timing structure. The starting symbol may be indirectly indicated by a transmission level indication. It may be considered that a configuration indicates one or more starting symbols in a second transmission timing structure, e.g. indicating possible starting symbols for acknowledgement signaling. The configuration may indicate which one of those symbols to use, e.g. based on transmission level and/or operating conditions and/or quality of service requirements. It may be considered that the configuration indicates, e.g. indirectly, that the next available starting symbol is to be used after reception of the first transmission timing structure, and/or the next available starting symbol useable considering time for processing. It may be considered that the configuration indicates which channel to use for the acknowledgement signaling, e.g. PUCCH or PUSCH. Generally, a configuration may indicate a starting symbol pattern, indicating one or more starting symbols available for acknowledgement signaling, e.g. providing different opportunities for such signaling in a slot or other transmission timing structure. A starting symbol pattern representing PUCCH opportunities may be considered a PUCCH structure. It may be generally considered that the configured pattern extends over one or more transmission timing structures.

It may be considered that transmitting the acknowledgement signaling comprises utilizing a mini-slot for transmitting, in which the acknowledgement signaling is embedded. The mini-slot may cover, and/or be associated to, at least the starting symbol for transmission, e.g. in uplink or sidelink.

The first transmission timing structure and the second transmission timing structure may pertain to, and/or be associated to, the same, or different, carriers and/or subcarrier spacings and/or numerologies. Different carriers may be arranged such they do not share a border in frequency space, and/or that a frequency gap is between them. The frequency gap may be or comprise a frequency interval of at least 1 GHZ, 5 GHZ, 10 GHZ, 20 GHZ or 50 GHz. Generally, the first transmission timing structure may be associated to a first carrier, and the second transmission timing structure may be associated to a second carrier. The first carrier and the second carrier may be carriers of a carrier aggregation, and/or belong to the same carrier aggregation. Generally, the first carrier may be a downlink carrier, and the second carrier may be an uplink carrier. However, variants in which the first carrier is a sidelink carrier and the second carrier is also a sidelink carrier may be considered. The sidelink carriers may be the same (e.g., in a Time Division Duplex, TDD, scenario), or different (e.g., in a Frequency Division Duplex, FDD, and/or a carrier aggregation, CA, scenario). In some variants, the first carrier and the second carrier may be the same carrier and/or partially overlap in frequency. In such a case, it may be considered that different numerologies are associated to the carriers and/or the associated transmission timing structures.

Transmitting or receiving based on a transmission timing structure may comprise transmitting or receiving on the carrier associated to the transmission timing structure.

The acknowledgement signaling may generally be considered to be in response to the (expected) first signaling, which may for example be scheduled/configured by the network node. Thus, acknowledgment signaling may be later in time than the first signaling.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing.

The first transmission timing structure may pertain to downlink transmission (or sidelink transmission to be received by the UE). The second transmission timing structure may pertain to uplink transmission (or sidelink transmission to be transmitted by the UE). The transmission timing structures may be shifted relative to each other, e.g. due to signal traveling time. A transmission timing structure may be considered to pertain to a certain type of communicating and/or a carrier or numerology or subcarrier spacing if it is synchronized to the timing structure, and/or the timing of communication is determined by the timing structure, and/or communicated symbols are arranged in the timing structure. The first transmission timing structure may be a slot or mini-slot. The second transmission timing structure my in particular be a slot. A slot may comprise a predetermined number of symbols, e.g. 7 or 14. A mini-slot may comprise a number of symbols smaller than the number of symbols of a slot. A transmission timing structure may cover a time interval of a specific length, which may be dependent on symbol time length and/or cyclic prefix used. A transmission timing structure may pertain to and/or cover a specific time interval in a time stream, e.g. synchronized for communication.

In some variants, the first number of symbols may be smaller than the second number of symbols. This may in particular be the case if the transmission timing structures pertain to the same carrier, e.g. if the first transmission timing structure is a mini-slot, and the second transmission timing structure is a slot.

The time interval associated to the first transmission timing structure may be shorter than the time interval associated to the second transmission timing structure. In some variants, the number of symbols of the first and second transmission timing structures may be the same (e.g., both may represent a slot).

It may be considered that the first transmission timing structure is embedded in, and/or overlapping, the second transmission timing structure. Such embedding or overlapping may be considered to be in time domain. The first transmission timing structure being embedded in the second transmission timing structure may refer to the symbols (all symbols) of the first transmission timing structure being arranged within the time interval associated to the second transmission timing structure. The first transmission timing structure overlapping the second transmission timing structure may refer to at least one of the symbols of the first transmission timing structure being fully or at least partly arranged within the time interval associated to the second transmission timing structure.

For embedding or overlapping, borders (in time domain) of the timing structures and/or borders (in time domain) of the symbols of the timing structures may coincide.

Generally, the starting symbol may be the first symbol in which the acknowledgement signaling is transmitted. The acknowledgment signaling may extend (in time) over more than one symbol, covering one or more symbols after the starting symbol. In some cases, the acknowledgement signaling may extend beyond the second transmission timing structure, e.g. into a successive transmission timing structure.

The first signaling may generally comprise transmission of data, which may be associated to an acknowledgement signaling process (or more than one such processes) and/or a data stream. The first signaling may comprise one (e.g., if pertaining to only one process) or more data elements or data blocks, in particular transport blocks.

The first transmission timing structure may pertain to OFDM (Orthogonal Frequency Division Multiplexing) symbols, e.g. in NR downlink, and/or the second transmission timing structure may pertain to OFDMA (Orthogonal Frequency Division Multiple Access) or SC-FDMA (Single Carrier Frequency Division Multiple Access) symbols, e.g.

in NR uplink. In some variants, e.g. in sidelink scenarios, the first transmission timing structure may pertain to SC-FDMA symbols. In this context, a frequency component, respectively a use of frequency domain for information transport may be implied by a symbol next to its symbol time length defining timing structures.

A transmission timing structure may have a duration (length in time) determined based on the durations of their symbols, possibly in addition to cyclic prefix/es used. The symbols of a transmission timing structure may have the same duration, or may in some variants have different duration.

The configuration may be based (e.g., determined by the network node and/or a determining module thereof) on a reliability level and/or latency level (the term "transmission level" may be used for either or a combination of both). Such a level (or levels) may be represented or indicated by a corresponding indication or indicator, and/or be associated to or pertain to the data to be transmitted using the one or more data streams. A level or indication may be indicated directly/explicitly, or indirectly/implicitly. A reliability level may be indicated by, and/or represent, a desired and/or required error rate and/or error probability, for example a Block Error Rate (BLER), and/or indicate a maximum number of errors or some similar. A latency level may indicate a desired or required latency and/or response speed. A transmission level may for example be indicated by a quality of service requirement and/or indication, and/or the number of data streams associated to transmitting the data and/or a transmission mode. A transmission level may for example indicate Ultra Reliable Low Latency Communication (URLLC). There may be defined different transmission levels, with several levels of reliability and/or latency. The combination indication may be determined based on the transmission level indicated for the data. Examples of explicit/direct indication comprise one or more combination indicators, e.g. in signaling, e.g. comprising one or more messages. A combination indication, in particular a transmission level indication, may be provided for, and/or pertain to, a bearer and/or logical or transport channel, from which the data streams may be provided. The configuration may indicate the transmission level.

A program product comprising instructions causing processing circuitry to control and/or perform any one of the methods described herein is also disclosed.

Moreover, there is disclosed a carrier medium arrangement carrying and/or storing a program product as disclosed herein.

The approaches presented herein allow flexible reaction to different timing structures in the context of acknowledgment signaling processes, in particular for highly delay sensitive use cases (e.g., URLLC). Also, if different numerologies are used, buffer space related to HARQ may be saved, in particular if acknowledgement signaling is transmitted on a low frequency carrier of a carrier aggregation also comprising a high frequency carrier or a carrier with larger subcarrier spacing and thus relatively large buffer requirements. For example, acknowledgement signaling may be provided with lower delay, enabling emptying the buffers associated to acknowledgment signaling processes quickly.

BRIEF DESCRIPTION OF THE DRAWINGS

The drawings are provided to illustrate concepts and approaches described herein, and are not intended to limit their scope. The drawings comprise:

FIG. 14, showing a diagram for a method of operating a network node;
and
FIG. 15, showing an exemplary network node.

DETAILED DESCRIPTION

Figure 1:
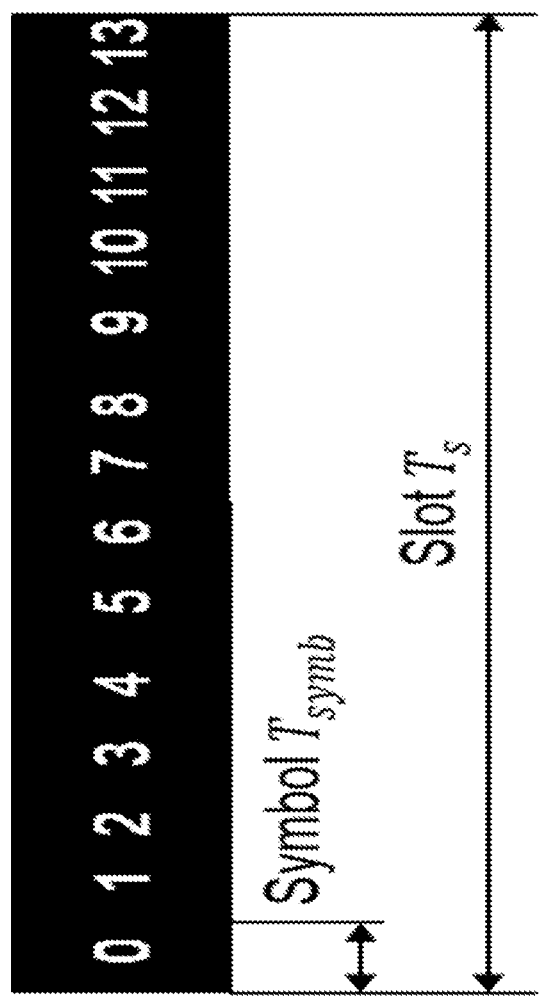
FIG. 1, showing a NR slot.

An NR subframe or slot (as example of a transmission timing structure) consists of several OFDM symbols, according to current agreements either 7 or 14 symbols (OFDM subcarrier spacing ≤60 kHz) and 14 symbols (OFDM subcarrier spacing >60 kHz). FIG. 1 shows a slot or subframe with 14 OFDM symbols. In FIGS. 1, $T_c$ and $T_{cymb}$ denote the slot and OFDM symbol duration, respectively.

Figure 2:
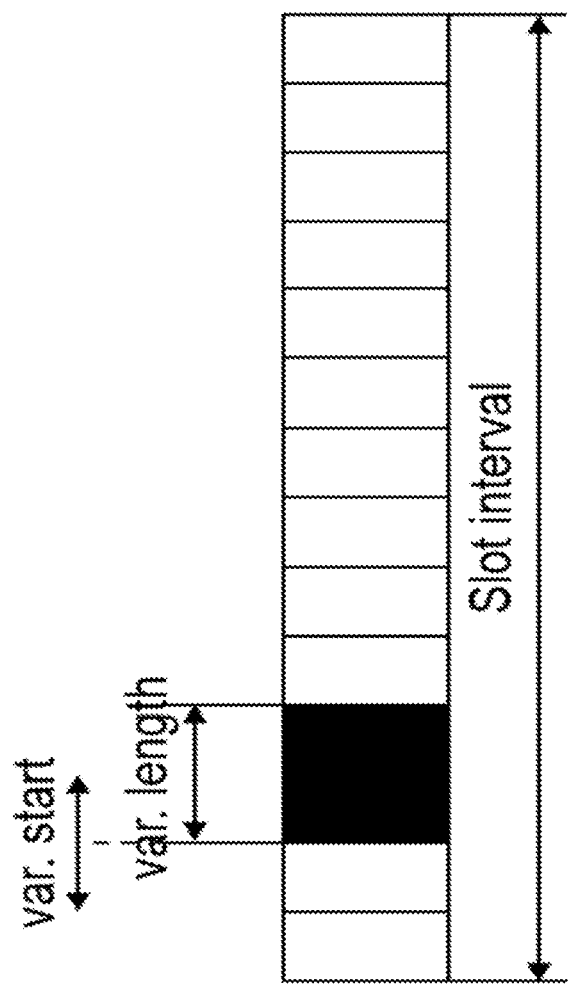
FIG. 2, showing exemplary mini-slots in a slot.

In addition to slots, NR also defines mini-slots. Mini-slots are shorter than slots (according to current agreements from 1 or 2 symbols up to number of symbols in a slot minus one) and can start at any symbol within a slot. Mini-slots may be used if the transmission duration of a slot is too long or the occurrence of the next slot start (slot alignment) is too late. Applications of mini-slots include among others latency critical transmissions (in this case both mini-slot length and frequent opportunity of mini-slot are important), and use of unlicensed spectrum, where a transmission should start immediately after listen-before-talk succeeded (here the frequent opportunity of mini-slot is especially important). An example of mini-slots is shown in FIG. 2.

Numerology is described in the following. NR operating frequency range extends from sub-1 GHz to 100 GHz. To cover this wide range of carrier frequencies, NR supports different OFDM numerologies: More narrow subcarrier spacing at lower frequencies and wider subcarrier spacing for small cells, often at high frequencies. OFDM symbols with narrow subcarrier spacing are long (in time domain) and also have a long cyclic prefix which is important for deployments in large cells. Wide subcarrier spacing provides robustness towards phase noise and Doppler, which is particularly important at high frequencies. OFDM symbols with wide subcarrier spacing are short in time and thus also have a short cyclic prefix (given same overhead) which limits them to small cells. OFDM numerologies with wide subcarrier spacing are typically used at high carrier frequencies (due to phase noise robustness) or in low latency applications (due to short symbol duration).

Table 1 lists for some different OFDM numerologies OFDM symbol duration, normal cyclic prefix duration, symbol length incl. cyclic prefix, and slot length (assuming 14 symbols per slot). Additional numerologies to those shown in Table may be envisioned as well.

| Subcarrier spacing in kHz | OFDM symbol duration in µs | Cyclic prefix length in µs | Total symbol duration in µs | Slot length in µs |
|---|---|---|---|---|
| 15 | 66.67 | 4.69 | 71.35 | 1000 |
| 30 | 33.33 | 2.34 | 35.68 | 500 |
| 60 | 16.67 | 1.17 | 17.84 | 250 |
| 120 | 8.33 | 0.59 | 8.92 | 125 |

NR will also support mixing of numerologies where different OFDM numerologies can be mixed on one carrier. One use case could be to use narrowband subcarrier spacing for MBB and wideband subcarrier spacing for low latency applications at a low frequency carrier. In large cells the wideband numerology potentially requires an extended cyclic prefix to match the delay spread.

Carrier aggregation is described in the following. LTE and also NR support carrier aggregation. One expected carrier aggregation scenario for NR is to aggregate a carrier in low bands (e.g. below 6 GHZ) with a carrier in high bands (e.g. mmW bands, for example at 28 or 39 GHZ). The carrier in the low band could be deployed to cover a wide cell area and would therefore have a narrow subcarrier spacing. The carrier in the mmW requires a wide subcarrier spacing for phase noise robustness. Carrier aggregation between carriers with different numerologies is therefore an important scenario in which the approaches described herein may be implemented.

Figure 3:
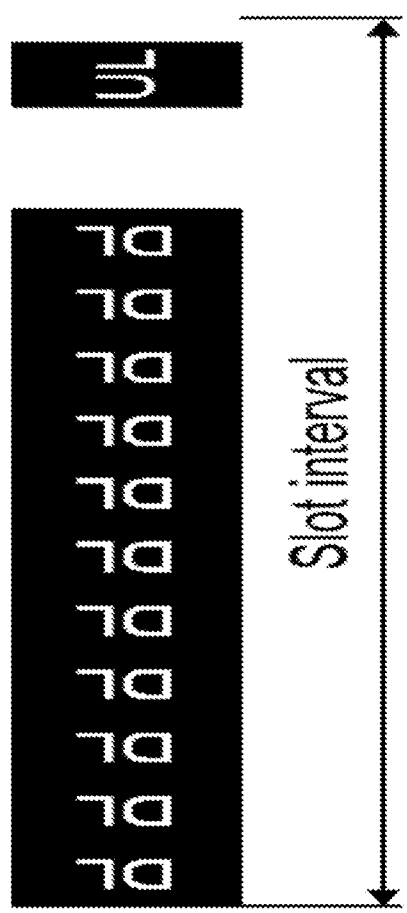
FIG. 3, showing a PUCCH arrangement in a slot as UL signaling.

An uplink control channel is described in the following. NR will support different formats of the Physical Uplink Control Channel (PUCCH). PUCCH carries Uplink Control Information (UCI) comprising acknowledgement signaling like HARQ feedback (ACK/NACK), and/or Channel Quality Information (CQI), and/or Scheduling Request (SR). One of the supported PUCCH formats is short and occurs at the end of a slot interval, as shown in FIG. 3. This figure shows UE downlink reception and UE transmission in one figure, the UL is time advanced and thus occurs slightly before the slot interval ends.

Figure 4:
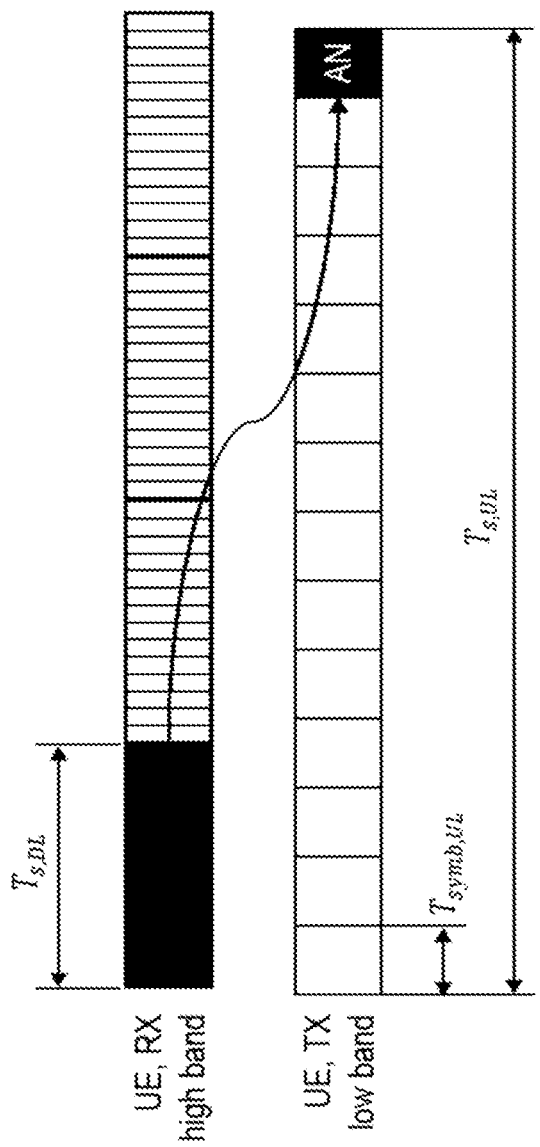
FIG. 4, showing carrier aggregation with high and low band carriers.

In a carrier aggregation scenario, acknowledgment signaling, e.g. on PUCCH, may be transmitted in the low band. Propagation conditions are worse in the high band and it could be beneficial to carry control signaling in the low band. Similar to the problem with mini-slots, with the current PUCCH structure, HARQ feedback can only be sent at the end of the slot interval. Low band carriers often operate with a narrow subcarrier spacing and thus long slots; when HARQ feedback is sent in the low bands it may occur much later than the corresponding DL slot, as shown in FIG. 4.

The increased roundtrip time may negatively impact throughput, e.g. if TCP protocol is used and also increases the amount of un-acknowledged data a UE has to buffer increasing UE complexity. FIG. 4 shows how, in a carrier aggregation scenario with different numerologies in downlink and uplink, PUCCH is sent in the low band. Low band carrier has long slots and PUCCH is transmitted much later. This figure only focuses on one DL transmission and the corresponding HARQ feedback transmission (ACK/NACK, AN); other signaling (other boxes) may contain other transmissions. The upper row shows a "fast" numerology, in a high band, with a (downlink) slot with duration (length in time domain) $T_{S,DL}$. The lower row shows the "slow" numerology, with a much longer duration $T_{S,UL}$. The small intervals indicate the respective symbol time interval underlying the slots.

It is generally suggested that HARQ feedback (ACK/NACK, AN) transmissions are enabled not only at the end of a slot interval but also at additional time positions within a slot interval, potentially up to every symbol (depending on latency requirements).

The HARQ feedback can be put into a PUCCH that occurs at a symbol within a slot interval. Alternatively, the PUCCH can also be seen as transmitted within a mini-slot (either an uplink mini-slot or as part of a bi-directional mini-slot). It can even be considered to enable UCI on PUSCH with PUSCH either being part of a mini-slot or a regular slot PUSCH. The HARQ feedback, and/or the (starting) symbol of the HARQ feedback as acknowledgement signaling may be configured to the user equipment.

Advantages also occur if HARQ feedback for OFDM symbols with wide subcarrier spacing (such as high band carrier in carrier aggregation scenario) is carried by OFDM symbols with narrow subcarriers and long symbols (and thus long slots, e.g. for a low band carrier in carrier aggregation). Even though outlined in the context of carrier aggregation, the approaches herein are not limited to carrier aggregation, but are for example also applicable to scenarios where "slow" numerology (long symbol/slot time interval) is used to provide feedback for "fast" numerology (shorter symbol/slot time interval).

Figure 5:
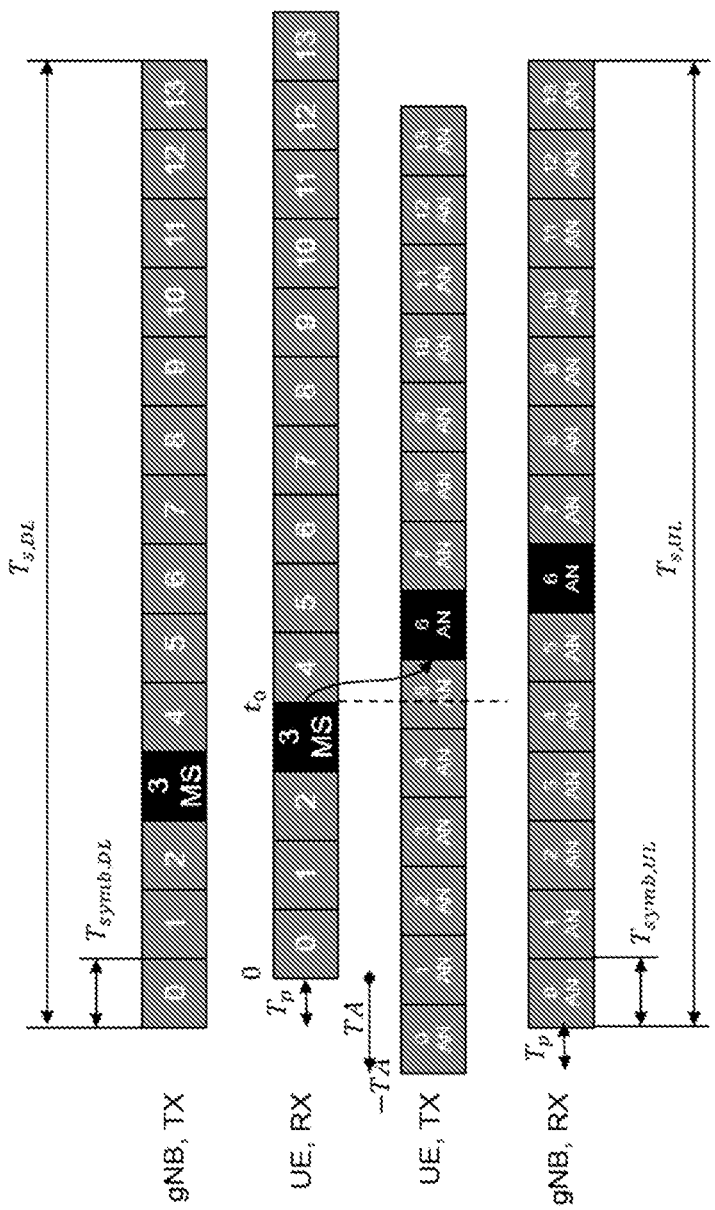
FIG. 5, showing a configuration for acknowledgement signaling.

FIG. 5 shows an example that illustrates that ACK/NACK (or more general HARQ feedback) can be provided in any symbol. This is an extreme case, configurations with less frequent HARQ feedback reporting opportunities can of course be envisioned as well. Examples would e.g. be every 2nd or 3rd symbol or dense irregular pattern, e.g. symbols 0, 3, 6, 7, 9, 12. FIG. 5 shows that an opportunity for HARQ feedback is provided in every symbol. A mini-slot is transmitted in downlink symbol 3 in the slot interval, the corresponding HARQ feedback in uplink symbol 6. In this example, the other AN opportunities are not used.

Figure 6:
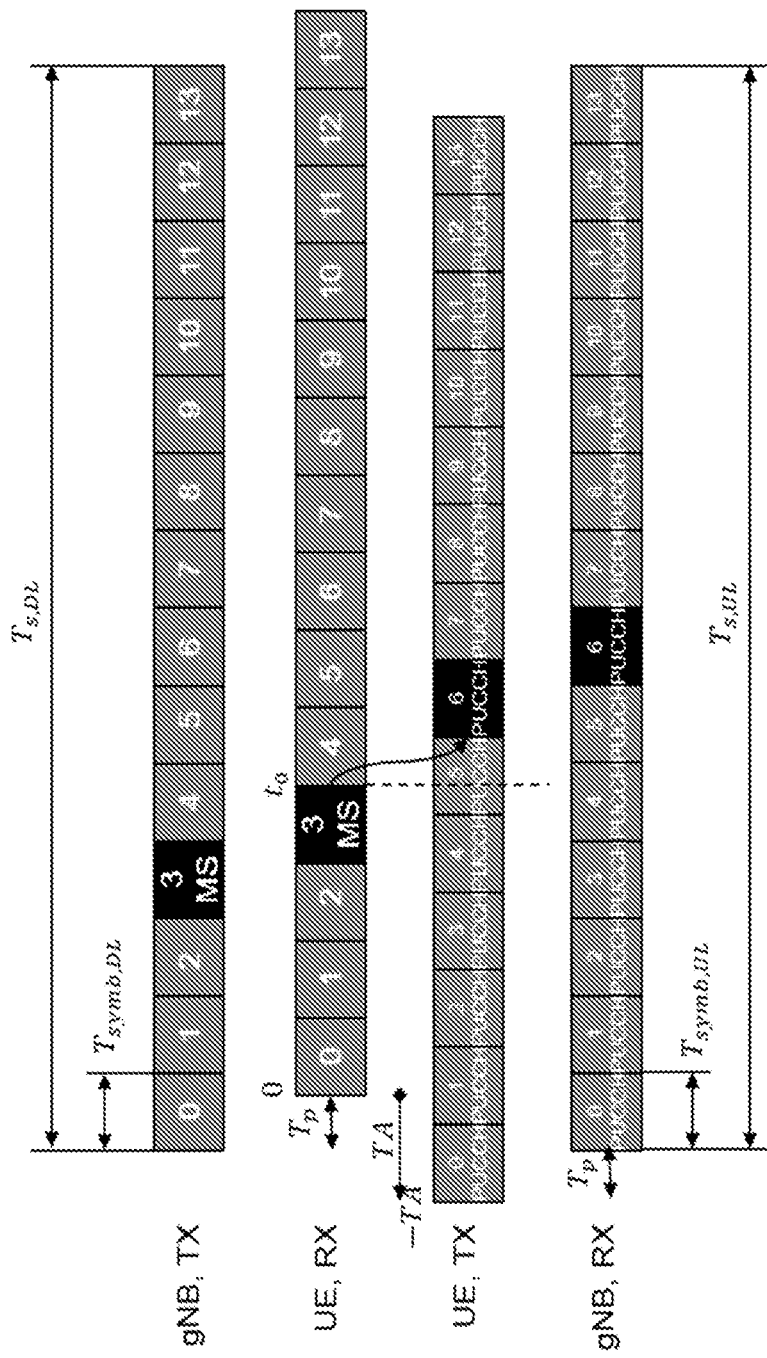
FIG. 6, showing another configuration for acknowledgement signaling.

In FIG. 6 the ACK/NACK opportunities are realized by providing PUCCH opportunities every symbol, i.e. ACK/NACK is transported on the PUCCH. Different options on which channels to provide HARQ feedback are discussed. Specifically, FIG. 6 shows that opportunity for PUCCH is provided in every symbol. A mini-slot is transmitted in downlink symbol 3 in the slot interval, the corresponding HARQ feedback on PUCCH in uplink symbol 6. In this example the other PUCCH opportunities are not used, or could be used for other UCI transmission.

Figure 7:
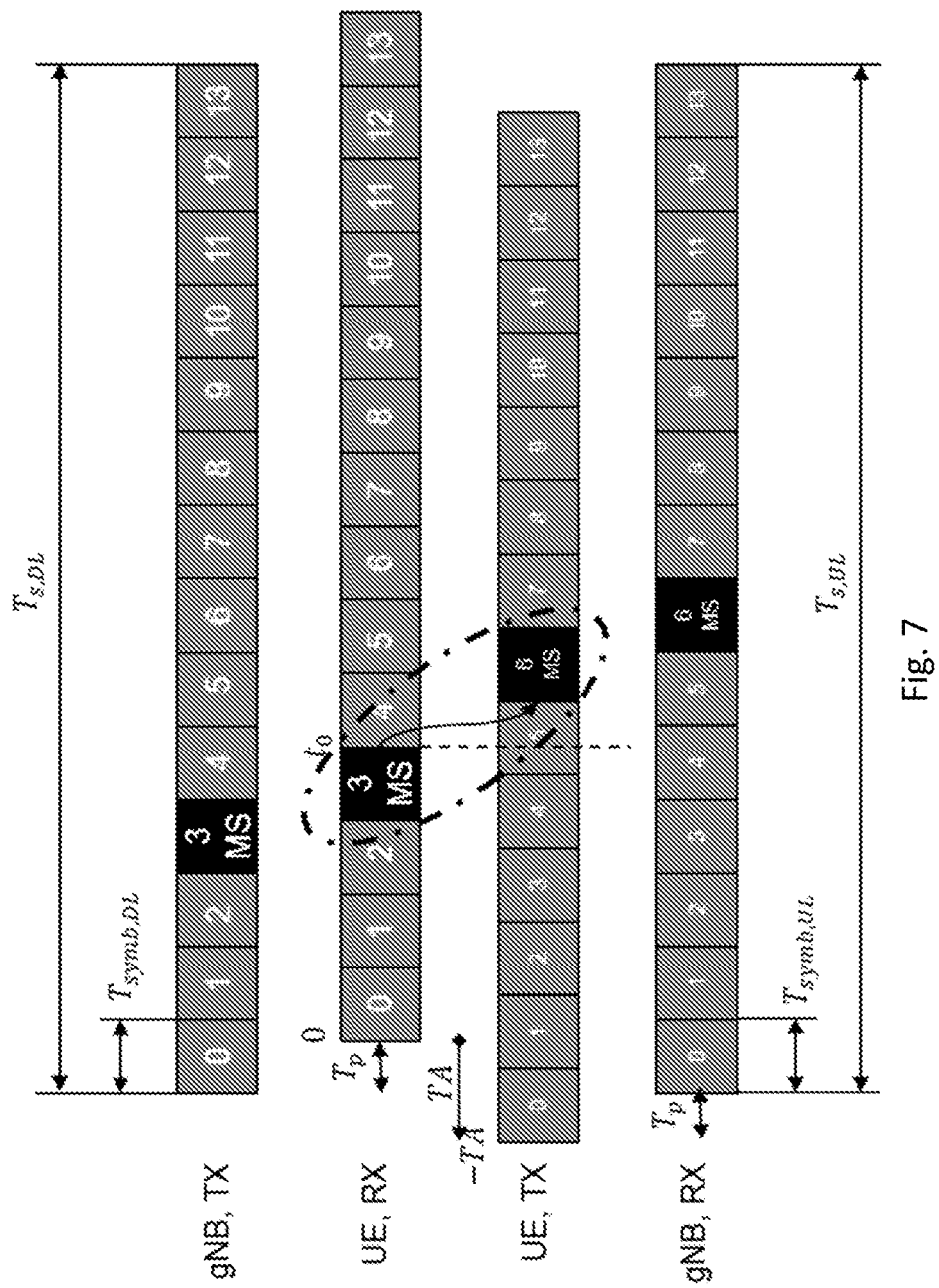
FIG. 7, showing yet another configuration for acknowledgement signaling.

Another example how HARQ feedback opportunities can be provided frequently is for example using uplink mini-slots. In the example shown in FIG. 7, the downlink mini-slot in symbol 3 is followed by a mini-slot in uplink (in symbol 6) that carries the corresponding HARQ feedback (the mini-slot in uplink represents a second transmission timing structure overlaid on the uplink slot). In this uplink mini-slot, HARQ feedback can either be provided on PUCCH (e.g., the mini-slot would have a configured PUCCH) or as UCI on PUSCH, i.e. the mini-slot contains PUSCH transmission which contains HARQ feedback (and potentially other information such as user data as well).

The uplink mini-slot can either be a "stand-alone" uplink mini-slot, or a mini-slot may contain a downlink part (the mini-slot in downlink direction) together with an uplink part (the mini-slot in uplink transmission). This is indicated by the dashed ellipse in FIG. 7.

Figure 8:
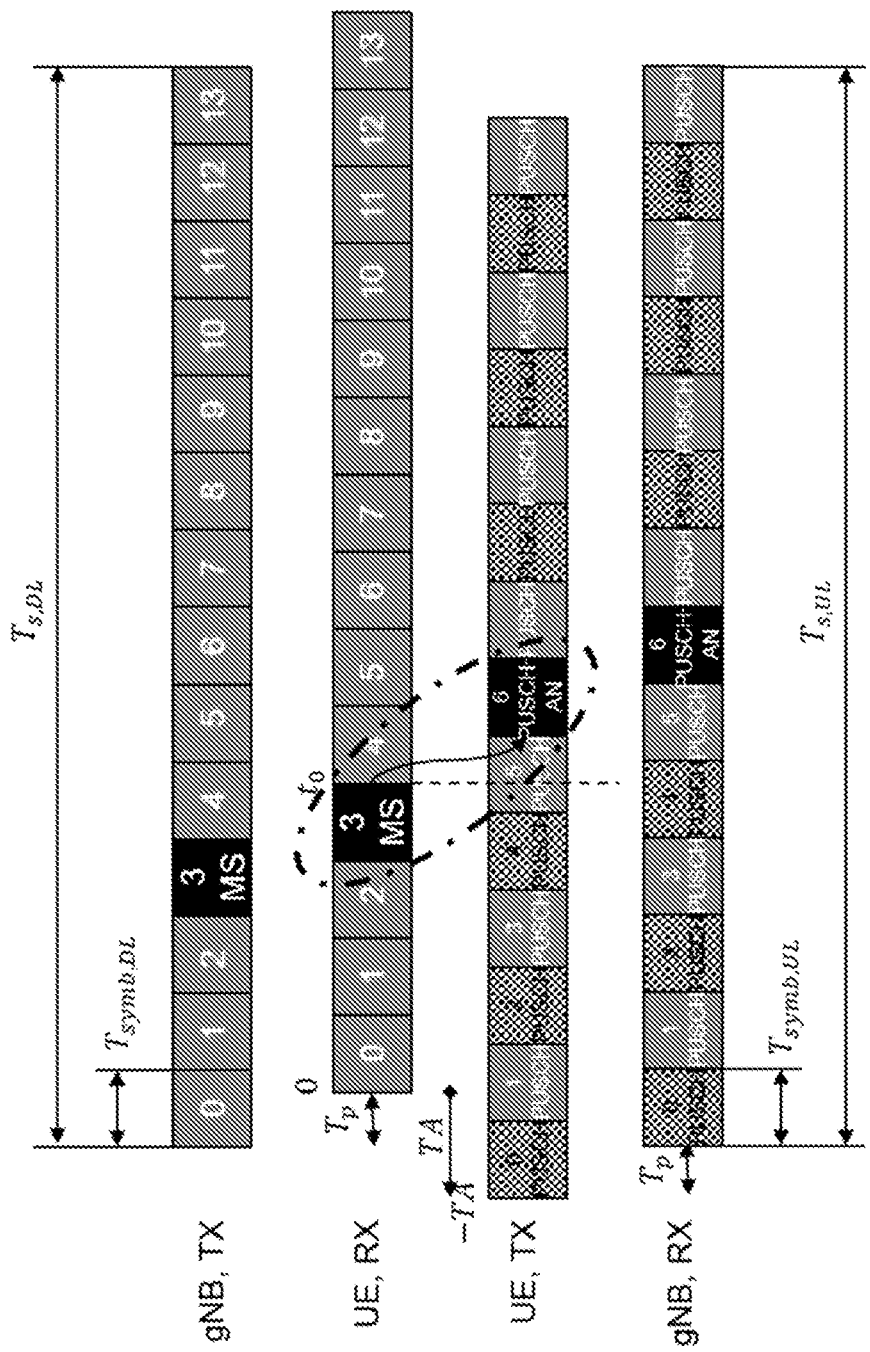
FIG. 8, showing yet another configuration for acknowledgement signaling.

Yet another possibility is to extend the concept of UCI on PUSCH. Here a "regular" PUSCH associated with a slot transmission provides opportunities to insert HARQ feedback at several symbol positions, as shown in FIG. 8. A PUSCH transmission provides opportunities to insert HARQ feedback at several symbols within the PUSCH duration. In the shown example, HARQ feedback can be inserted every second symbol (dashed), but only the opportunity in symbol 6 is used.

It may be envisioned to combine more than one or all of the above listed possibilities, e.g. such that a configuration indicates which approach is selected, or which approaches are to be combined. For example, a PUCCH opportunity may be configured every second symbol, and a terminal can use also PUSCH (either in a slot or mini-slot). If a UE does not have any data to transmit, it could select one of the PUCCH resources, while if the terminal also has a PUSCH resources scheduled (either in slot or mini-slot) it could transmit HARQ feedback as UCI on PUSCH.

It should be noted that generally each PUCCH or PUSCH opportunity may be considered to represent a (starting) symbol for acknowledgment signaling.

Time-domain aspects are discussed in the following.

Figure 9:
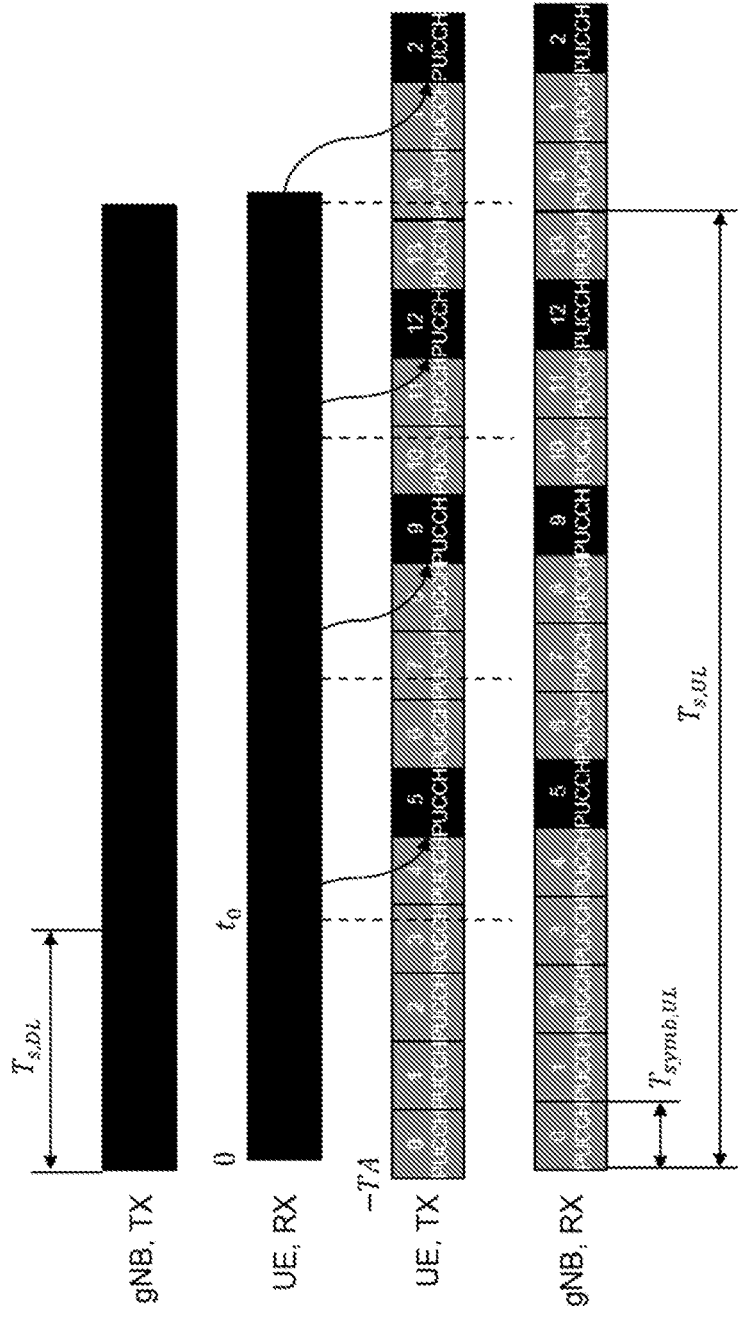
FIG. 9, showing yet another configuration for acknowledgement signaling.

Another example of frequent HARQ feedback transmissions is shown in FIG. 9, corresponding to a carrier aggregation example with the modification, that HARQ feedback can occur in every symbol in the low band (UE, TX, PUCCH). Alternatively, configurations with less dense HARQ feedback opportunities can be envisioned (a different starting symbol pattern may be configured). In this example, it may be assumed that HARQ feedback is provided on PUCCH, and PUCCH opportunities exist every symbol. All the other discussed options to transport HARQ feedback are also applicable here.

FIG. 9 shows a timing diagram for DL and UL transmissions at transmitter and receiver for carrier aggregation example with different numerologies. A PUCCH opportunity exists in every uplink OFDM symbol (or, correspondingly, every SC-FDMA symbol).

In the following, it is assumed that that OFDM symbols and slot counters are restarted at every subframe (which is defined as 1 ms, independent of numerology). A downlink transmission in slot s_DL ends at time t_0=(s_DL+1) T_(s, DL). The earliest uplink OFDM symbol l' that can carry HARQ feedback for this transmission must fulfil.

$$-TA + l'T_{symb,UL} \geq t_0 + T_{proc}.$$

Uplink slot and symbol within the slot for the HARQ-carrying PUCCH may be determined as $$l' = \left\lceil \frac{t_0 + \tau_{proc} + TA}{T_{symb,UL}} \right\rceil = \left\lceil \frac{(s_{DL}+1)T_{s,DL} + T_{proc} + TA}{T_{symb,UL}} \right\rceil$$

$$l = l' \bmod N_{s,UL}$$

-continued
$$S_{UL} = \left\lfloor \frac{l'}{N_{s,UL}} \right\rfloor.$$

In above example, it has been assumed PUCCH can be transmitted in every symbol. Less dense values of PUCCH can be envisioned as well, leading to correspondingly adapted equations.

In above examples, it has been assumed that all uplink symbols have equal length ($T_{symb,UL}$) and all downlink symbols have equal length ($T_{symb,DL}$). Above concepts and formulas can easily be extended to the case if a slot contains symbols of different lengths. In NR, for example, the first symbol in an interval of 0.5 ms may have a slightly longer cyclic prefix than the remaining symbols in the interval. In above examples, a one-symbol PUCCH has been assumed. If PUCCH is longer than a single symbol, above calculations refer to the starting symbol.

In LTE, a timing advance, TA, value is signaled with MAC control elements from eNB to UE. A similar signaling approach may be considered for NR. MAC control element signaling does not provide 100% reliability, and error cases can occur, e.g. the UE may miss timing advance commands in MAC control elements. In case of error cases, gNB and UE have not exactly the same understanding of TA, and if gNB and UE independently apply above formulas, they may determine different slot intervals and symbols for PUCCH transmission. To avoid such error cases, the gNB may configure the UE based with the specific symbol (or slot and symbol) for the acknowledgement signaling, e.g. based on determining for a given DL (mini-)slot transmission, the slot interval and symbol of the corresponding PUCCH transmission and signal the resource/s symbol position to the UE. This signaling could for example be dynamic (e.g. gNB includes PUCCH resource indicator or information from which PUCCH resource can be derived in scheduling DCI). Alternatively, or in addition, the gNB may configure—e.g. semi-statically via RRC signaling—PUCCH resources for a (mini-)slot transmission occurring in a given downlink slot interval/symbol. This configuration could for example be a (e.g., single or unique) mapping between slot interval (and symbols for mini-slots) of downlink transmission and slot interval and symbols of corresponding PUCCH transmissions. This mapping could also be variable, e.g. the gNB could configure different mappings and signals (in e.g. the scheduling DCI) which of the configured mapping to use. Such mappings could for example be based on calculations similar to above equations.

Table 2 shows an example of a variable mapping between downlink transmission time and PUCCH transmission time. This example assumes 15 kHz numerology with normal cyclic prefix and $N_s$=14 symbols per slot. For the UE a processing delay $T_{proc}$=100 us is budgeted. The four configurations Conf0 to Conf3 assume max TA values of 40, 110, 250, and 667 µs, respectively (with 6, 16.5, 37.5, and 100 km max communication distance). Dynamic signaling (e.g. contained in the scheduling DCI) could select one these four configurations.

TABLE 2

Variable mapping between downlink transmission timing of mini-slots and uplink timing of corresponding PUCCH transmission.

| Mini-slot ends in symbol | Conf0 Slot interval | Conf0 Symbol | Conf1 Slot interval | Conf1 Symbol | Conf2 Slot interval | Conf2 Symbol | Conf3 Slot interval | Conf3 Symbol |
|---|---|---|---|---|---|---|---|---|
| 0 | same | 3 | same | 4 | same | 6 | same | 12 |
| 1 |  | 4 |  | 5 |  | 7 |  | 13 |
| 2 |  | 5 |  | 6 |  | 8 | next | 0 |
| 3 |  | 6 |  | 7 |  | 9 |  | 1 |
| 4 |  | 7 |  | 8 |  | 10 |  | 2 |
| 5 |  | 8 |  | 9 |  | 11 |  | 3 |
| 6 |  | 9 |  | 10 |  | 12 |  | 4 |
| 7 |  | 10 |  | 11 |  | 13 |  | 5 |
| 8 |  | 11 |  | 12 | next | 0 |  | 6 |
| 9 |  | 12 |  | 13 |  | 1 |  | 7 |
| 10 |  | 13 | next | 0 |  | 2 |  | 8 |
| 11 | next | 0 |  | 1 |  | 3 |  | 9 |
| 12 |  | 1 |  | 2 |  | 4 |  | 10 |
| 13 |  | 2 |  | 3 |  | 5 |  | 11 |

In some variants described herein, it is described to enable quick HARQ feedback for downlink transmissions using OFDM numerology with wider subcarrier than uplink transmissions (and thus uplink slots or symbols are longer than downlink slots or symbols) by providing HARQ feedback opportunities that do not only exist at the end of a slot interval, but also within a slot interval according to a configuration. In the extreme case, HARQ feedback resources can be configured for every uplink OFDM symbol in a slot interval. Possibilities to realize so frequent HARQ feedback opportunities are short PUCCH opportunities (e.g., only covering a starting symbol) in multiple symbols (in the extreme case in every symbol), using e.g. mini-slots for HARQ feedback, or to enable HARQ feedback insertion opportunities at multiple symbols for UCI on PUSCH.

The provided formulas and discussions which node does the determination of PUCCH resources (both gNB and UE, only gNB and signals resources) as well as the discussion on frequency-domain resources are additional details, but the basic principle and top level claim are frequent HARQ feedback resources within a slot interval.

Figure 10:
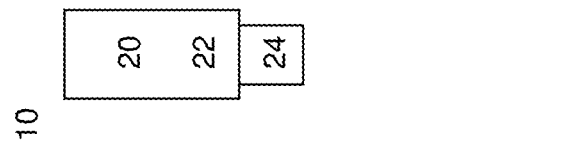
FIG. 10, showing an exemplary terminal or UE.

FIG. 10 schematically shows a terminal or wireless device 10, which may be implemented as a UE (User Equipment). Terminal 10 comprises processing circuitry (which may also be referred to as control circuitry) 20, which may comprise a controller connected to a memory. Any module of the terminal, e.g. a transmitting module or receiving module, may be implemented in and/or executable by, the processing circuitry 20, in particular as module in the controller. Terminal 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the terminal 10 is connected or connectable to the radio circuitry 22 to collect or send and/or amplify signals. Radio circuitry 22 and the processing circuitry 20 controlling it are configured for cellular communication with a network, e.g. a RAN as described herein. Terminal 10 may generally be adapted to carry out any of the methods for operating a terminal or UE disclosed herein; in particular, it may comprise corresponding circuitry, e.g. processing circuitry, and/or modules.

Figure 11:
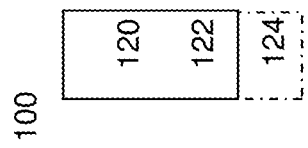
FIG. 11, showing an exemplary network node like a gNB.

FIG. 11 schematically show a network node 100, which in particular may be an eNB, or gNB or similar for NR. Network node 100 comprises processing circuitry (which may also be referred to as control circuitry) 120, which may comprise a controller connected to a memory. Any module, e.g. transmitting module and/or receiving module and/or configuring module of the network node 100 may be implemented in and/or executable by the processing circuitry 120. The processing circuitry 120 is connected to control radio circuitry 122 of the radio node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. processing circuitry, and/or modules. The antenna 124 circuitry may be connected to and/or comprise an antenna array. The network node 100, respectively its circuitry, may be adapted to transmit configuration data and/or to configure a terminal as described herein.

Figure 12:
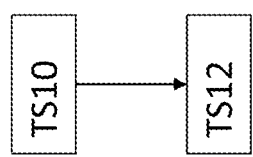
FIG. 12, showing a diagram for a method of operating a UE.

FIG. 12 shows a diagram for an exemplary method of operating a user equipment, which may be any of the user equipments described herein. The method comprises an action TS10 of receiving first signaling based on the first transmission timing structure; and an action TS12 of transmitting acknowledgement signaling pertaining to the first signaling based on the second transmission timing structure, wherein transmitting the acknowledgement signaling is started at a starting symbol of the second transmission timing structure, the starting symbol being determined based on a configuration of the user equipment.

Figure 13:
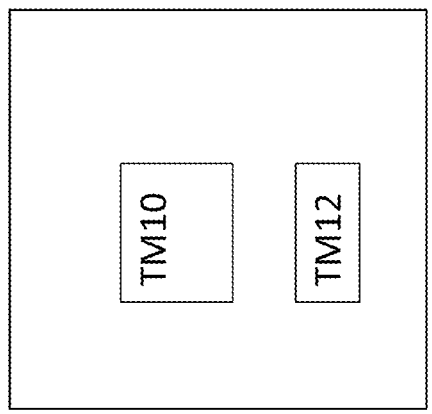
FIG. 13, showing an exemplary UE.

FIG. 13 shows a schematic of an exemplary user equipment. The user equipment may comprise a receiving module TM10 for performing action TS10, and a transmitting module TM12 for performing action TS12.

FIG. 14 shows a diagram for an exemplary method of operating a network node, which may be any of the network nodes described herein, in particular a gNB or eNB. The method comprises an action NS10 of configuring a user equipment (10) for starting to transmit acknowledgement signaling pertaining to first signaling transmitted based on the first transmission timing structure at a starting symbol of the second transmission timing structure.

Figure 15:
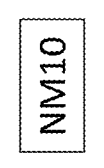

FIG. 15 shows a schematic of an exemplary network node. The network node may comprise a configuring module NM10 for performing action NS10.

An acknowledgement signaling process may be a process of transmitting and/or retransmitting data, based on acknowledgement signaling, e.g. acknowledgement feedback like HARQ or ARQ feedback. Acknowledgement signaling may comprise and/or represent acknowledgement information, which may represent an acknowledgment or non-acknowledgement, e.g. of correct reception of the corresponding data or data element, and optionally may represent an indication of non-reception. In particular, acknowledgment information may represent ARQ (Automatic Repeat request) and/or HARQ (Hybrid Automatic Repeat reQuest) feedback. Correct reception may include correct decoding/demodulation, e.g. according to an ARQ or HARQ process, for example based on error detection and/or forward error correction coding, which may be based on a data element being received. Correspondingly, incorrect reception (non-acknowledgement) may refer to detection of an error during decoding/demodulating. Non-reception may indicate non-reception of a data element and/or non-reception of an acknowledgement position indication indicating a mapping pertaining to the data element. Non-reception may for example be indicated by a DTX (Discontinuous Transmission) indication. It should be noted that there may be DTX on either side of a communication. The radio node determining and/or transmitting the acknowledgement signaling may not receive an expected data element of a data stream, and indicate this in the acknowledgement signaling as DTX, allowing more finely grained acknowledgment information. On the other hand, the radio node receiving acknowledgment signaling may not receive an expected acknowledgement signal (e.g., in one of the data streams), and treat this as a DTX event. Both kinds of DTX may be treated separately, e.g. as DTX1 and DTX2 or according to a different scheme.

Acknowledgement signaling may be signaling on an uplink control channel, in particular PUCCH, or alternative on an uplink shared channel like PUSCH.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. Acknowledgement signaling may comprise one or more bits (e.g., for ACK/NACK) for an acknowledgement signaling process, and/or comprise additional information, e.g. indicating that a data element was not received and/or scheduled.

Transmitting acknowledgement signaling may comprise encoding and/or modulating, Encoding and/or modulating may comprise error detection coding and/or forward error correction encoding and/or scrambling.

Transmitting acknowledgement signaling may be based on, and/or comprise, determining acknowledgement information pertaining to the one or more data elements. Determining such information may comprise performing an ARQ and/or HARQ process and/or determining correct reception of the data elements (and/or considering non-reception). Alternatively, or additionally, transmitting acknowledgement signaling may comprise and/or be based on receiving the data, respectively data elements, for example based on a configuration, which may be a downlink data configuration. Such a configuration may be configured by a network node. The configuration may (statically and/or dynamically, e.g. in part both) be valid for one, or more than one, time structure or TTI. However, in some cases, the configuration may be dynamically adapted for each time structure or TTI, e.g. as configured by a network node.

Acknowledgement signaling may be considered pertaining to downlink data if it comprises acknowledgement information pertaining to downlink data respectively the data element/s thereof. Downlink data may generally represent data transmitted on a downlink channel, e.g. subject to one or more ARQ or HARQ processes. A data element may in particular represent a (e.g., a single) data block (like a transport block), which may be associated to a specific ARQ/HARQ process. In particular, different data streams, respectively their data element/s, may be associated to different ARQ/HARQ processes (which may run in parallel).

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular acknowledgement signaling, may comprise a plurality of signals and/or messages, which may be transmitted on different carriers and/or be associated to different acknowledgement signaling processes, e.g. representing and/or pertaining to one or more such processes. An indication, in particular a combination indication, may comprise signaling and/or a plurality of signals and/or messages, which may be transmitted on different carriers and/or be associated to different acknowledgement signaling processes, e.g. representing and/or pertaining to one or more such processes.

A radio node may generally be considered a device or node adapted for wireless and/or radio (and/or microwave) frequency communication, and/or for communication utilizing an air interface, e.g. according to a communication standard.

A radio node may be a network node, or a user equipment or terminal. A network node may be any radio node of a wireless communication network, e.g. a base station and/or gNodeB (gNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent and end device for communication utilizing the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries.

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

Error coding may comprise for example error detection coding (EDC) and/or forward error coding (FEC). Error coding may generally be handled (e.g., encoded and/or decoded) by processing circuitry of a radio node.

The coding (for error correction) and/or the error detection bits may be provided by performing error detection coding, in particular encoding, the size of the coding may represent or correspond to the number of error detection bits and may be referred to as coding length or error detection coding length. Error detection coding, in particular encoding, may be performed by a transmitting node and/or an EDC encoding module of the transmitting node. A coding may be represented by one or more codes and/or algorithm to be performed when coding. A coding for decoding may be complementary to a corresponding coding for encoding (and vice versa).

Analogously, the correction coding and/or the error correction bits may be provided by performing (forward) error correction coding, in particular encoding, the size of the coding may represent or correspond to the number of error correction bits and may be referred to as correction coding length or error correction coding length. Forward error correction coding, in particular encoding, may be performed by a transmitting node and/or an FEC encoding module of the transmitting node.

Encoding for error detection may comprise determining and/or calculating one or more EDC bits, in particular a predetermined number of EDC bits (corresponding to the coding length) and/or according to a chosen algorithm. In particular, encoding for error detection may comprise utilizing a CRC (Cyclic Redundancy Check) algorithm.

Encoding for forward error correction may comprise determining and/or calculating one or more FEC bits, in particular a predetermined number of FEC bits (corresponding to the correction coding length) and/or according to a chosen algorithm. In particular, encoding for forward error correction may comprise utilizing an error correcting algorithm or code, e.g. a convolutional code and/or a Hamming code and/or Reed-Solomon code and/or a Reed-Muller code and/or a turbo code, or any other suitable FEC code.

Decoding (for error detection coded data and analogously for FEC encoded data) may comprise utilizing a coding for decoding error encoded data, wherein the coding in particular may have a coding length. The coding may be configured, e.g. by a transmission node, and/or be pre-determined. Decoding error detection coding may comprise determining whether (or not) an error occurred when transmitting and/or decoding the data. Decoding error detection decoding and/or such determining may comprise determining a probability that one or more errors occurred (and/or a probability, that no error occurred), based on the error detection coding. This decoding may comprise comparing the probability (and/or corresponding parameter/s or a set of parameters) with a threshold (or corresponding threshold value). Decoding may be based on one or more data elements representing the same data, e.g. of the same data stream and/or of different data streams, e.g. as indicated by the combination indication.

In general, acknowledgement may be indicated by the acknowledgment signaling comprising one or more acknowledgment signals or bits (ACK), the number of such signals may be dependent on the use case, and/or by acknowledgement signaling representing and/or comprising one out of a set of acknowledgement combinations. Non-acknowledgement may be indicated by acknowledgement signaling representing and/or comprising one out of a set of non-acknowledgment combinations. The sets may be subsets of the set of all possible combinations of acknowledgement signals transmitted for a plurality of processes and/or data streams. Each signal may for example indicate ACK or NACK (or one or more other states, e.g. DTX) for associated process/es, and each combination may comprise more than one such signal. Which combination/s represent/s acknowledgement (indicating new data elements to be transmitted), and which non-acknowledgment (indicating retransmission) may be preconfigured (e.g., by higher-layer signaling) and/or predefined (e.g., according to a standard).

In the context of this disclosure, HARQ ACK/NACK (acknowledge for a correctly received block of data, not acknowledged for a not correctly received block of data) feedback may refer to feedback (e.g. a corresponding signal transmitted, which may comprise 1 or more bits) provided (e.g. on the UL) by a terminal, e.g. to a network or network node in response to data transmitted to it (e.g. on the DL). HARQ ACK//NACK information or feedback (or shorter HARQ-ACK information or feedback or HARQ information or feedback or just HARQ) may include transmitting a signal/bit indicating whether a transport block of data received by the terminal has been receiver correctly or not. HARQ and/or determining HARQ may include decoding and/or error detection procedures to determine correct reception. There may be defined a number of HARQ processes with associated HARQ ids or numbers, which may refer to individual data streams and/or associated data elements; a HARQ response or feedback from a terminal (e.g. a HARQ bit) may be associated to one of the HARQ processes or ids. In some variant, HARQ feedback may comprise one bit per DL carrier; in other variant, HARQ feedback may comprise two (or more than two) bits per carrier, e.g. dependent on the rank used. Generally, HARQ feedback may be transmitted (and/or determined, e.g. based on received signals and/or transport blocks and/or data and/or HARQ process identifiers) by a terminal, and/or a terminal may be adapted for, and/or comprise a HARQ module for, determining (e.g., as mentioned above) and/or transmitting HARQ feedback, in particular based on and/or using a configuration and/or a modulation configured, e.g. a modulation determined and/or configured as described herein. Transmitting HARQ may generally be performed on a UL control channel, e.g. PUCCH.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node.

Signaling may generally comprise one or more signals and/or one or more symbols. Reference signaling may comprise one or more reference signals or symbols.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE.

A resource generally may represent a time-frequency resource, on which signaling according to a specific format may be transmitted and/or be intended for transmission. The format may comprise one or more substructures, which may be considered to represent a corresponding sub-resource (as they would be transmitted in a part of the resource).

Control information or a control information message or corresponding signaling may be transmitted on a control channel, e.g. a physical control channel, which may be a downlink channel or uplink channel. For example, the combination indication may be signaled by a network node on PDCCH (Physical Downlink Control Channel) and/or a PDSCH (Physical Downlink Shared Channel) and/or a HARQ-specific channel. Acknowledgement signaling may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

A transmission timing structure may be a transmission time interval. The term transmission time interval (TTI) may in this context correspond to any time period over which a physical channel can be encoded and optionally interleaved for transmission. The physical channel may be decoded by the receiver over the same time period (TO) over which it was encoded. Examples of TTI comprise short TTI (sTTI), transmission time, slot, sub-slot, mini-slot, mini-subframe etc. A TTI may comprise a one or more symbol time intervals, and/or one or two slot time intervals, wherein e.g. 7 or 14 symbol time intervals may correspond to a slot time interval. Time interval-related terms may be considered to follow 3GPP nomenclature. A mini-slot or shortened slot or short TTI may correspond to a plurality of symbol time intervals, e.g. 2 or 3 or 4 or 5 or 6 or 7 symbol time intervals.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., regarding one or more transmission timing structures and/or scheduled first signaling (e.g., data transmission) and/or the starting symbol. A radio node may configure itself, e.g., based on configuration data received from a network or network node. A network node may utilize, and/or be adapted to utilize, its circuitry/ies for configuring.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A carrier may generally represent a frequency range or band. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency space.

It should be noted that the term "radio" in this disclosure may be considered to pertain to wireless communication in general, and may also include wireless communication utilizing microwave frequencies.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency space and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency space and/or related to one or more carriers or subcarriers.

A sidelink may comply with, and/or be implemented according to, a specific standard, e.g., a LTE-based standard and/or NR. A sidelink may utilize TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilizing a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilizing the sidelink for communication (respectively, for signaling). Sidelink transmission and/or transmitting on a sidelink may be considered to comprise transmission utilizing the sidelink, e.g. associated resources and/or transmission formats and/or circuitry and/or the air interface. Sidelink reception and/or receiving on a sidelink may be considered to comprise reception utilizing the sidelink, e.g. associated resources and/or transmission formats and/or circuitry and/or the air interface. Sidelink control information (e.g., SCI) may generally be considered to comprise control information transmitted utilizing a sidelink. Acknowledgement signaling, as well as signaling of an acknowledgement position indication may be considered examples of SCI, albeit in different directions of communication between participants. In particular, acknowledgement signaling may be considered to be in response to other control signaling (e.g., configuring control signaling), and thus be referred to as response control signaling. Configuring control signaling generally may configure a UE, e.g. schedule resources and/or a resource pool. Signaling of an acknowledgment position indication may be considered an example of configuring control signaling.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise:
Abbreviation Explanation
ACK Acknowledgement
CQI Channel Quality Information
DCI Downlink Control Information
DL Downlink
mmW Millimeter Wave
MAC Medium Access Control
NACK Negative Acknowledgement
OFDM Orthogonal Frequency Division Multiplex
PUCCH Physical Uplink Control Channel
PUSCH Physical Uplink Shared Channel
RRC Radio Resource Control
RX Reception, Receiving/Receiver
SR Scheduling Request
TCP Transmission Convergence Protocol
TX Transmission, Transmitting/Transmitter
UCI Uplink Control Information
UL Uplink

The invention claimed is:

1. A method of operating a user equipment (UE) in a New Radio (NR) Radio Access Network, the method comprising:
   receiving first signaling in a first slot; and
   transmitting Hybrid Acknowledgement Repeat Request (HARQ) feedback pertaining to the first signaling in a second slot;
   the HARQ feedback transmission starting at a starting symbol in the second slot and extending in time over more than one symbol;
   the starting symbol being determined based on a starting symbol pattern; and
   the starting symbol pattern indicating a plurality of symbols available for starting transmission of acknowledgement signaling in the second slot, the starting symbol pattern being based at least in part on a variable mapping between a downlink transmission time and a physical uplink control channel (PUCCH) transmission time, the mapping being based at least in part on a timing advance (TA) configuration.

2. The method according to claim 1, wherein the first slot and the second slot pertain to the same numerology.

3. The method according to claim 1, wherein the first slot and the second slot pertain to different numerologies.

4. The method according to claim 3, wherein the first slot is shorter in time domain than the second slot.

5. The method according to claim 1, wherein the first slot is overlapping, in time, with the second slot.

6. The method according to claim 1, wherein the starting symbol pattern indicates symbols available less dense than at every symbol in the second slot.

7. A user equipment (UE) for a New Radio (NR) Radio Access Network, the UE comprising processing circuitry and radio circuitry and being configured to utilize the processing circuitry and radio circuitry to:
   receive first signaling in a first slot; and
   transmit Hybrid Acknowledgement Repeat Request (HARQ) feedback pertaining to the first signaling in a second slot;
   the HARQ feedback transmission starting at a starting symbol in the second slot and extending in time over more than one symbol;
   the starting symbol being determined based on a starting symbol pattern; and
   the starting symbol pattern indicating a plurality of symbols available for starting transmission of acknowledgement signaling in the second slot, the starting symbol pattern being based at least in part on a variable mapping between a downlink transmission time and a physical uplink control channel (PUCCH) transmission time, the mapping being based at least in part on a timing advance (TA) configuration.

8. The user equipment according to claim 7, wherein the first slot and the second slot pertain to the same numerology.

9. The user equipment according to claim 7, wherein the first slot and the second slot pertain to different numerologies.

10. The user equipment according to claim 9, wherein the first slot is shorter in time domain than the second slot.

11. The user equipment according to claim 7, wherein the first slot is overlapping, in time, with the second slot.

12. The user equipment according to claim 7, wherein the starting symbol pattern indicates symbols available less dense than at every symbol in the second slot.

13. A network node for a New Radio (NR) Radio Access Network, the network node comprising processing circuitry and radio circuitry and being configured to utilize the processing circuitry and radio circuitry to:
    transmit, to a user equipment (UE), first signaling in a first slot; and
    receive, from the UE, Hybrid Acknowledgement Repeat Request (HARQ) feedback pertaining to the first signaling in a second slot;
        the HARQ feedback transmission starting at a starting symbol in the second slot and extending in time over more than one symbol;
        the starting symbol being determined based on a starting symbol pattern; and
        the starting symbol pattern indicating a plurality of symbols available for starting transmission of acknowledgement signaling in the second slot, the starting symbol pattern being based at least in part on a variable mapping between a downlink transmission time and a physical uplink control channel (PUCCH) transmission time, the mapping being based at least in part on a timing advance (TA) configuration.

14. The network node according to claim 13, wherein the first slot and the second slot pertain to the same numerology.

15. The network node according to claim 13, wherein the first slot and the second slot pertain to different numerologies.

16. The network node according to claim 15, wherein the first slot is shorter in time domain than the second slot.

17. The network node according to claim 13, wherein the first slot is overlapping, in time, with the second slot.

18. The network node according to claim 13, wherein the starting symbol pattern indicates symbols available less dense than at every symbol in the second slot.

19. The network node according to claim 13, wherein a number of symbols in the first slot and the second slot are equal.

* * * * *